United States Patent
Lammens et al.

(10) Patent No.: US 7,088,470 B2
(45) Date of Patent: Aug. 8, 2006

(54) ALL-DEVICE-SPACE AUTOMATIC BLACK REPLACEMENT

(75) Inventors: Johan Lammens, Barcelona (ES); Jacint Humet Pous, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 09/874,524

(22) Filed: Jun. 4, 2001

(65) Prior Publication Data

US 2003/0025924 A1 Feb. 6, 2003

(51) Int. Cl.
*G06K 15/00* (2006.01)

(52) U.S. Cl. .................. 358/1.9; 358/2.1; 358/529; 358/515

(58) Field of Classification Search ............... 382/162, 382/167; 358/515, 519, 521, 522, 529, 530, 358/1.9, 2.1, 3.01
See application file for complete search history.

(56) References Cited

U.S. PATENT DOCUMENTS

| | | | | | |
|---|---|---|---|---|---|
| 4,349,835 A | * | 9/1982 | Horiguchi et al. | ........... | 358/527 |
| 5,329,385 A | * | 7/1994 | Washio | ........................ | 358/515 |
| 5,359,437 A | * | 10/1994 | Hibi | ............................ | 358/529 |
| 6,118,550 A | * | 9/2000 | Hayashi | ...................... | 358/296 |
| 6,499,829 B1 | * | 12/2002 | Tabata et al. | .................. | 347/43 |
| 6,665,096 B1 | * | 12/2003 | Oh | ............................. | 358/461 |

* cited by examiner

*Primary Examiner*—Jerome Grant, II
(74) *Attorney, Agent, or Firm*—Peter I. Lippman

(57) ABSTRACT

A direct device-space-to-device-space transform adjusts the amount of actual black ink, to avoid highlight and midtone granularity in incremental printing—but with no need for translation into perceptual space. If the amount of black ink specified in the input data for a particular color is very small or very large, then that specified color is passed through the transform without substantial change. Thereby the amount of actual black ink and other colorants is held as nearly as practical at levels dictated by device-space input specifications while minimizing visible granularity. Replacement behavior is chosen to smoothly blend between different kinds of operation in different tonal ranges. This system accommodates personnel trained in classical printing-press technologies, who are accustomed to full control over amounts of black and other colorants.

23 Claims, 3 Drawing Sheets

ALL-DEVICE-SPACE AUTOMATIC BLACK REPLACEMENT

RELATED PATENT DOCUMENTS

Related documents are other, coowned U.S. utility-patent documents hereby incorporated by reference in their entirety into this document. One is in the names of Alexander Perumal and Paul H. Dillinger, and issued as U.S. Pat. No. 5,657,137. Another is in the name of Paul H. Dillinger and issued as U.S. Pat. No. 5,377,024. Still others are in the name of Kent D. Vincent, U.S. Pat. No. 5,671,059; and in the names of Thomas H. Baker et al., U.S. Pat. No. 6,832,824. Yet another is in the names of Antoni Gil Miquel et al., and is patent application Ser. No. 09/642,417.

FIELD OF THE INVENTION

This invention relates generally to machines and procedures for incremental printing of text or graphics on printing media such as paper, transparency stock, or other glossy media; and more particularly to preparations for such printing, based upon data initially in the form of device-state color specifications—such as for instance four-color separations.

For the purposes of this document, and in particular the appended claims, "incremental printing" and "incremental printer" encompass all printers and copiers that perform directly computer-controlled construction of images by small increments. Incremental printers thereby form images piecemeal, either directly on the print medium—as in the case of inkjet, dot-matrix or wax-transfer systems—or on an electrostatically charged drum immediately before transfer to the medium as in the case of laser printers. Thus by "incremental printer" and "incremental printing" it is intended to exclude printing presses and their operation, which transfer a whole image from a master negative or plate that is prepared previously in a separate operation using a different apparatus.

The present invention employs unique procedures to prepare four-color separations and like device-space data for use in incremental printing. The invention aims to avoid excessive grain in certain tonal ranges, for such input data, while preserving much of the actual-black colorant decisions expressed in such device-space data.

BACKGROUND OF THE INVENTION

This invention addresses a special problem of excessive graininess in incremental printing of images initially prepared for printing in terms of four-color separations or equivalent. Four-color separations are in effect a device-space language, the language traditionally used for input data in make-ready procedures preliminary to printing-press operation.

(a) "Ink thinkers"—Although printing-press techniques are definitely not the field of the present invention, color printing-press technology has existed far longer and has long been one of the most popular areas of vocational training. Millions of people the world around have been trained in the traditional field of graphic arts, and of letterpress or offset printing make-ready.

That training typically includes a very extensive set of protocols for design of colorant in a piece to be printed. Some of those protocols relate to the somewhat more traditional prepress technology of the process camera and its follow-on procedures—i. e. making and stripping up four-color negatives (including the so-called "bumping" of exposures to control final hardcopy quality), and exposure of printing plates through the finished negatives to produce press masters.

Other protocols relate to more-modern procedures for generating negatives (or plates directly) in computer systems. All these procedures are highly elaborated, so that people who have learned them are actually able to remember a remarkable number of interactions among the pragmatic effects that result from various combinations of processing adjustments or refinements.

In particular, overprinting of black or dark gray ink with a tone of some chromatic ink—such as, often, magenta—is known in the traditional graphic arts, especially for printing-press make-ready, as producing a striking and even compelling visual effect. The experience generated in the mind or eye of the final viewer is different from, and deeper than, might be predicted from the modern calorimetric theory that has grown up around incremental printing.

Indeed, that modern theory by and large almost denies that there can be any physical meaning to a color produced by adding a chromatic colorant to a full or very nearly full black. Yet the artisans trained in the traditional printing-press arts know better, and may sometimes describe the result of such specialized overprinting tactics as imparting extra "kick" or "punch" to an image—or as a "nonspectral" effect.

Thus, generally speaking, these trained people have been taught to think in terms of ink—the ink that will go into the press from cans, and that will be summoned out of the press and onto the paper (or other printing medium) by the exact character of images formed on the plates. Even though it is in principle a rather roundabout mental gymnastic, these artisans have studied and learned to conceptualize the final outcome of a printing job not on the basis of any theoretical perceptual color theory but rather on the basis of ink. They are the "ink thinkers".

The corps of personnel trained in these matters have learned quite sophisticated ways to produce fine effects in output hardcopies. It requires substantial investment in months and years of experience to be able to foretell how various small differences in film and plate preparation will impact—several process steps and often one or two departments later—upon a stream of final hardcopies from a press.

Many of the individuals thus trained are extremely competent, and are justifiably proud of their abilities. Rightfully, they are well regarded as craftswomen and craftsmen in the highest sense.

As the technology of incremental printing has matured and acquired a certain dominance for short-run work, naturally many of those people have been attracted to this new field. It is only natural that those people should expect to bring with them the extremely extensive approaches that they spent their formative years learning. Those approaches are indeed remarkably powerful in the context of printing-press operations.

(b) Loss of ink-thinking—Those approaches unfortunately cannot be realized within the conventional framework of the more modernly arrived incremental printing—which instead of inking concepts has focused upon theoretically better-grounded perceptual-color concepts. Despite the fact that such modern approaches may be better in theory, they are quite alien to those artisans who came up through the traditional printing arts.

Furthermore, the capability in which they are so experienced, and so well educated, is simply inaccessible in incremental printing. It is not merely that they must learn a new language or a new set of mental habits: these artisans are in general readily capable of such effort.

The problem is greater. The conventional computer programs and procedures developed to control incremental printers simply refuse to give over fully effective color control to personnel who wish to enter color specifications in the form of four-color separations, for a printing job. As noted above, many incremental-printing control systems essentially deny physical meaning to a great category of the color specifications developed in that way.

(There are other reasons to preserve direct control over quantity of black, as through four-color separations or other forms of device-space color specs. For instance, some printers do not support the use of true black on some media—as for example in the case of printers with pigmented black and dye-based color inks.)

What the printing-press corps of artisans has long been able to create with a printing press, simply cannot be done in a high-quality manner through incremental printing. It is true that some incremental-printing control systems can accept four-color separations as inputs; however, as subsection (e) below will explain, these systems in at least one way and sometimes two distinct ways defeat the expectations of the ink-thinkers.

That subsection describes the customary use of perceptual color spaces in incremental printing. In preparation for that discussion, however, some additional facts about undercolor removal, graininess and black replacement will be helpful.

(c) Undercolor or gray-component removal, and graininess—Incremental printers are somewhat more sensitive than printing presses to generation of excessive graininess in highlight and midtone regions. This problem arises in rendition of the neutral component of a color.

By "neutral component" is meant to encompass not only light grays to midrange grays but also a portion of any color that has some common amount of all three subtractive primaries (cyan C, magenta M and yellow Y). It is well known that this common amount of three color inks—in purest calorimetric principle—can be replaced by a like amount of a single ink, namely black.

Such a replacement has recognized benefits. It reduces the total quantity of ink used and the associated expense, and in theory also provides a greater guarantee of actual colorimetric neutrality for the nominally neutral component.

Consequently such replacement, known as "undercolor removal" (UCR) or "undercolor replacement" has been made an automatic feature of many color-management schemes commonly used in incremental printing. Unfortunately terminology in this field varies considerably, but UCR usually refers to removal and replacement of the entire common quantity of the three subtractive primaries.

A related but somewhat more-general phrase, "gray-component replacement" (GCR), is usually used to refer to removal and replacement of all or only part of the available common quantity of those three primaries. For purposes of simplicity in the remainder of this document, unless otherwise indicated by context all references to "UCR" will mean "UCR or GCR, or both, as appropriate".

As mentioned above, automatic UCR has been built into many printers. It is also well known, however, that in incremental-printing practice such a replacement has important drawbacks:

For highlight and low-midtone regions, the resulting black ink dots—as compared with the calorimetrically equivalent grouping of color primary dots—intrinsically must be spaced relatively farther apart, thus appearing as graininess. Furthermore in some kinds of incremental printers (particularly inkjet printers) this is modernly aggravated by a trend for black pens to produce lower-quality image features than other pens.

(In the inkjet field, printheads are often called "pens" although they are far more complicated and sophisticated than the familiar unitary-writing-element model of e. g. a manually used ballpoint or fountain pen. For purposes of this document, except as otherwise indicated by context the term "pen" is to be understood as encompassing any incremental-printing printhead—whether inkjet or not, and even including a pagewide array.)

Reasons for this trend are not fully understood. It has been speculated that artifacts in black features are more visible simply because contrast is higher for black features generally, relative to the background.

In the printing-press world, by comparison, UCR is not a major problem. There, placement is extremely precise and accurate; and moreover the inks and the printing media used in the printing-press field are much more forgiving giving of representation of neutral components by black ink.

UCR-generated graininess, in particular, is at a very acceptable level in printing-press operations. Regrettably this cannot be said of UCR in the incremental-printing environment.

(d) "Black replacement" or "BR"—Therefore in the incremental-printing field it has also become commonplace to institute certain limitations or exceptions to the use of UCR. In particular, it is known to pause in the process of establishing color rendition and replace quantities of tentatively established black, in highlights and midtones, with equivalent amounts of chromatic color.

Such a replacement is seen in the previously mentioned patent of Perumal and Dillinger, who refer to "black replacement" (BR) and even to an extension of that approach, "black and secondary color replacement". The phrase "tentatively established", however, is very important to understanding here—as Perumal and Dillinger do not reverse the entire regimen of replacements.

That is, they do not go so far as to remove black from any input color specification, i. e. anything that might be called "original" black. Hence for purposes of this document their use of phrases such as "black replacement", and also the short acronym "BR" as used in the present document, are strictly limited to the particular Perumal and Dillinger form of replacement, which means only replacement of an intermediate numerical value, representing a tentatively established quantum of black, in their calculations.

BR heretofore has been used only in those types of incremental printing that are based on original images generated or received through typical computer-graphics programs—that is, programs which operate either in additive-primary (red R, green G and blue B) color space or in a perceptual color space such as CIELAB. A few other incremental-printing systems are controlled by alternative color spaces which are related to perceptual spaces or are special-purpose perceptual/device-space hybrids, as for instance the "hue plus gray" space introduced in the previously mentioned patent of Dillinger.

Replacement of black by chromatics may possibly be known in the printing-press environment too, but if so it is discretionary and fully under control of the artisan. The number of personnel—if any—familiar with this technique for highlight regions is surely smaller than those familiar with, say, overprinting of a chromatic tone on top of black. The use of such replacement may be regarded as a subtle effect, for extra-smooth highlights, as compared with such overprinting—which is instead a dramatic effect.

Thus a good working knowledge of such replacement technique, if known at all in the printing-press environment, may perhaps be confined to those workers needing enhancements for special applications such as fine-art reproduction projects. Because UCR is not usually a major problem in the printing-press environment, replacement of black by chromatics is not a simple necessity of life there—as it is in incremental printing.

Therefore this discussion is not at all intended to suggest that black replacement should be eliminated, when performing incremental printing based on device-space color specifications: very much the contrary is the case. In incremental printing heretofore, however, BR has been invoked automatically by a perceptual-color stage—discussed below—and it is this grounding in customary perceptual theory that is objectionable.

(e) The colormap—This shorthand terminology "the colormap" is often used in referring to mapping or conversion of input color specifications into a perceptual or hybrid space for manipulation. For instance some computer-graphics programs receive inputs in the form of additive-RGB specifications and perform a transformation upon those numbers to derive equivalent perceptual values.

Then after complete manipulation the program reconverts the resulting colors into subtractive CMYK for printing. Programs of the colormap type dominate the incremental-printing field and in fact are sophisticated and extremely useful.

In fact such approaches have also been used in some computer programs that may be called "graphic arts" programs—which are specifically written to accept inputs in the form of subtractive device-space color data, and generate outputs that are nominally suitable for incremental printing. In other words, these programs are able to receive for instance four-color (usually CMYK) separations such as mentioned earlier.

Unfortunately passing such data into a colormap creates problems that are especially important and troublesome. These programs, just as in the RGB-input case, conventionally begin by converting the four-color separation data (or more generally subtractive device-space data) into a perceptual or hybrid space for manipulation. In fact sometimes these programs begin with an intermediate step of transforming CMYK inputs into RGB space, and then as usual converting to perceptual or hybrid space.

What is important to this discussion is not the exact order of events, but rather only the fundamental premise underlying the events. That premise is that perceptual space is the sole rational environment for color manipulations, preparatory to final conversion into (or back into) printing-device space for operation of some apparatus.

This premise represents a major misstep in the implementation of four-color separations by incremental printing. When four-color separation data are converted into any conventional perceptual space, of necessity the conversion process discards information that is often crucial to the image-design thinking which previously went into formulation of the four-color separations.

This discarding—of a critical part of the intelligence embedded in those device-space specifications—is one of the two ways, mentioned in subsection (b) above, in which customary incremental-printing systems defeat the intentions of the ink-thinker. More specifically, once a four-color separation set has been translated into perceptual terms, the originally intended allocation of inks to image regions can no longer be reconstructed.

Consequently every special colorant effect created by the graphic artist or printing make-ready technician is destroyed in this process. As that technician or artist would see it, the job has simply been ruined.

(f) Gamut, and nonideal inks—The conclusions in the preceding paragraph are true even for a color that in principle could have been reproduced within the perceptual system—i. e. colors within the theoretical gamut of the perceptual system. In other words, what a printing device will do with such a color, if the device is controlled on the basis of this sort of perceptual system, is to make an at least plausible approximation of the specified color.

The artist or technician has wholly lost control of the quantity of black actually printed. Still, in defense of the system in such cases it is fair to say that within the limits of conventional perceptual rendition theory—if not in terms of what can be perceived actually—the output color does correspond to the specified color.

Even in this case there are various degrees of failure of the correspondence. For example, a so-called "process black" obtained by adding cyan C, magenta M and yellow Y inks—or in another notation "CMY" composite black—may often appear very slightly brownish rather than dead black; whereas on the other hand at least one particular black ink actually displays a very slight magenta cast.

In such situations it is fair to say that neither inking is ideal; however, this is precisely where the skill of the ink-thinker becomes invaluable. Such a craftsperson considers it an essential part of the work to become familiar with the actual behavior of one or sometimes several given sets of inks, in a given printing system—an artistry largely lost upon users of perceptual systems.

Thereafter, for each printing job the ink-thinking artisan first judiciously selects the preferred visual effect and then specifies the corresponding ink—or combination of inks—within a selected ink set, to implement that desired effect. Of course such finesse is entirely foreclosed in prior-art systems that operate on a colormap basis.

As noted above, however, this is only the first of the two blows which a conventional incremental system deals to the experienced artisan who has come up through the printing industry. It is not the end of the story.

The second defeat comes from the way in which a conventional perceptual-space system, in incremental printing, defines color gamut and relates that gamut to device spaces. In such systems an image region that is endowed with a fully imprinted black has exhausted the available gamut of the system.

This comment should not be misunderstood as a statement about perceptual colorimetry in general. Of course when a spectrophotometer or proper colorimeter is used to measure the perceptual calorimetric content of an actually printed field of "full black" with an overprinted quantity of, say, magenta, such measuring apparatus clearly reports a calorimetric quantity which is very plainly different both from "full black" alone and from the overprinted quantity of magenta alone.

What is under discussion here is only the limited forward, Peprinting perceptual-color theoretical formulation that is customary in incremental printing. Within the confines of this conventional preprinting analysis, "black" is a unique color that occupies the bottom tip of a three-color-dimensional solid representing the system gamut.

In effect, within this limited preprinting formulation, black represents the practical absence of light. To attempt any further removal of light from such a color, in this kind of theoretical regime, is an oxymoron if not a conundrum.

In other words, in algorithms following this approach as noted previously it is without physical significance to propose application of a subtractive colorant—whether more black, or any other colorant—to such a full-scale application of black. In machine programming that adheres to this perceptual-color type of preprinting analysis, black ink alone is enough to consume all available degrees of freedom (even though a four-color-separation input signal has three more degrees of freedom not yet deployed).

Here not only has the verbatim specification of desired color been lost, as in the preceding section (e), but even before that step the preprinting process of translation into perceptual space has truncated the input amplitude. In other words the perceptual-theory system has entirely clipped the input signal to black, even though an important part of the input signal called for an overprinted tone in addition to the black.

Since a system so programmed must consider the desired color to be out-of-gamut, no amount of adjustment or tinkering can possibly represent that desired color within a conventional perceptual space. If the color rendition discussed in the preceding section was fairly described as "ruined", then it remains to find adequate words for what is discussed here.

Since these special effects are difficult if not impossible to produce, it goes without saying that the printed hardcopy will not compare favorably with the results of a comparable project executed using a printing press. What is gone is that extra "punch" which the ink-thinker can now only visualize but never produce.

(g) Summary—In incremental printing, to prevent a grainy appearance black ink should not be used in midtone or highlight image regions. For a printer with an RGB-only interface, this desired preclusion of black ink is managed nicely through the colormap.

This route to blocking black ink out of highlight and midtone regions, however, is unworkable for a graphic-arts printer with a CMYK interface—or more generally for a printer that accepts four-color separations as inputs. The reason is that the artist or technician loses control over the amount of actual black ink generated.

In such a system, process black (CMY) inputs and actual black (K) inputs are caused to become indistinguishable. Naturally they come out the same, even though personnel preparing the ink specification have carefully designated them as different.

Any effort to colormap a preseparated CMYK specification necessarily always discards information about actual black ink. Depending on the specific colors called for, such an effort sometimes also clips the input color specification before even beginning the transformation.

In short, four-color specs may be fed, willy-nilly, into colormaps—but cannot meaningfully pass through colormaps. Conventional colormap techniques are not applicable to device-color CMYK incremental printers.

(h) Conclusion—As this discussion has shown, limitations in conventional incremental-printing color spaces continue to impede use of device-space specifications such as generated by craftspeople in the traditional printing industry—and thereby also continue to impede achievement of excellent hardcopy generation competitive with printing-press products. Thus important aspects of the technology used in the field of the invention are amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of preparing for incremental printing of a color image. The phrase "incremental printing" is defined in an introductory section of this document.

The method includes the step of receiving or generating data representing a device-color implementation of the image, including respective initial representations of at least black ink and chromatic-color inks. The method also includes the step of applying a substantially direct transform to:

modify quantity of black ink represented in the data, and
recombine the modified quantity of black ink with the initial representations.

The word "substantially" is included here so that this description does encompass a method which includes some intermediate step that is insignificant in terms of black-ink data—i. e., a step that leaves the black-ink information available for direct processing in a subsequent step. (Such perfunctory inserted steps are sometimes included in machine-performed procedures simply in an effort to avoid patent claims.)

The foregoing may represent a description or definition of the first aspect or facet of the invention in its broadest or most general form. Even as couched in these broad terms, however, it can be seen that this facet of the invention importantly advances the art.

In particular, by working with an initial black-ink quantity directly—that is, without first going through a preliminary transformation that obscures the original intent of a graphic artist or printing technician—this method preserves information about planned rendering of the image. Because this aspect of the invention in its broadest form thus refrains from tampering with decisions of such personnel, this invention resolves a previously discussed problem of the prior art.

Although the first major aspect of the invention thus significantly advances the art, nevertheless to optimize enjoyment of its benefits preferably the invention is practiced in conjunction with certain additional features or characteristics. In particular, preferably the applying step includes automatic modification of black ink represented in the data in highlight and midtone regions of the image.

Another basic preference is that the applying step include automatic modification of two kinds of black-ink data: first, those same highlight/midtone black-ink data just mentioned—but for the particular purpose of mitigating graininess in those regions—and second, black ink represented in the data in darker regions of the image. As to these latter regions, the purpose is instead to smoothly blend black-ink quantities in the darker regions with the modified quantities in the highlight and midtone regions.

In the case of this two-purpose preference, it is further preferred that the automatic modification of black include establishing (1) a black-ink onset point; and also (2)—for use in regions of an image darker than the onset point—an increasing function of the initial representation of black ink. When this further preference is in use, then it is yet further preferred that the automatic modification of black further include merging the function into substantially a black-identity function in darkest regions of an image.

Another preference, alternative to this last-mentioned merging, is that the applying step further include automatic modification of chromatic-color inks to accommodate the black-ink modifications. In this case it is still further preferred that the applying step include automatically recombining the modified quantity of black in a way that is inversely proportional to the initial representations of at least the chromatic-color inks.

If this inverse-proportionality preference is observed, then nested within it are two additional alternative preferences. In one of these, the "automatically recombining" includes finding in a lookup table new quantities of those representations, corresponding to the quantified black-modifying. In the other alternative preference, final ink representations C', M', Y' and K' for cyan, magenta, yellow and black respectively are found from the expressions:

$$C'=C+(1-C)\cdot A_C(K)$$

$$M'=M+(1-M)\cdot A_M(K)$$

$$Y'=Y+(1-Y)\cdot A_Y(K)$$

$$K'=A_K(K)$$

where C, M, Y and K are the initial representations of the same colors respectively, and $A_C$, $A_M$, $A_Y$ and $A_K$ are respective preestablished automatic black-replacement functions.

We refer now to the first above-mentioned preference (dealing with automatic highlight/midtone black modification). Another subpreference, based upon that basic preference, is that the direct-transform application include finding in a lookup table new quantities of the representations, corresponding to the quantified black-modifying.

In another basic preference, the method further includes the step of splitting at least one of the final ink representations, to implement the at least one representation in available light and dark colorants. In yet another basic preference, color initially having no black-ink component is passed through without modification.

In still another basic preference the method also includes the step of applying the data with recombined black ink in printmasking for hardcopy printing. One further preference, alternative to all the foregoing, will be mentioned: here the method also includes the steps of a human operator's manipulation of a control that selects an amount and a direction of black-ink modification—and thereafter, substantially automatic operation of the direct transform to effectuate the modifying and recombining parts of the applying step according to the operator's selection.

In preferred embodiments of its second major independent facet or aspect, the invention is an incremental printing system for forming an image by construction from dots deposited on a printing medium, based upon original image data in device-color space. It will be understood, from mention of the medium and the data in this form of a preamble, that they are parts of the operating environment of the invention rather than parts of the invention itself.

(In the accompanying claims generally the term "such" is used—instead of "said" or "the"—in the bodies of the claims, when reciting elements of the claimed invention, for referring back to features which are introduced in preamble as part of the context or environment of the claimed invention. The purpose of this convention is to aid in even more distinctly and emphatically pointing out which features are elements of the claimed invention, and which are parts of its context—and thereby to more particularly claim the invention.)

This system includes a direct device-color to device-color computation module that is substantially automatic; this computation module modifies color image data with no manipulation in terms of perceptual color parameters. The system also includes an output incremental printing stage for printing the image from the modified data.

The foregoing may represent a description or definition of the second aspect or facet of the invention in its broadest or most general form. Even as couched in these broad terms, however, it can be seen that this facet of the invention importantly advances the art.

In particular, this aspect of the invention explicitly provides an incremental printing system that can accept as its input a set of device-state image specifications (such as for example color specifications prepared for use in a printing press)—and (because the computation module never manipulates data in perceptual terms) can do so without losing the device-color information embedded in the device-state specifications. This latter advantage is somewhat analogous to that of the first facet of the invention.

Although the second major aspect of the invention thus significantly advances the art, nevertheless to optimize enjoyment of i s benefits preferably the invention is practiced in conjunction with certain additional features or characteristics. In particular, preferably the automatic module includes an input for receiving the original image data in the form of initial four-or-more-color separations—and an output for directing four-or-more-color separations to the output stage.

Another basic preference is that the automatic module include a computation submodule for establishing (1) a black-ink onset point and (2) an increasing function of an initial amount of black ink, this function being for use in regions of an image darker than the onset point. In this case, preferably the automatic module further includes a computation submodule for merging the function into substantially a black-identity function in darkest regions of an image.

In preferred embodiments of its third major independent facet or aspect, the invention is an incremental printing method for forming an image by construction from dots deposited on a printing medium. This image forming is based upon original image data in device-color space.

The method includes the step of a direct device-color to device-color substantially automatic computation to modify color image data, with no manipulation in terms of perceptual color parameters. The method also includes the step of then incrementally printing a hardcopy image from the modified data.

The foregoing may represent a description or definition of the third aspect or facet of the invention in its broadest or most general form. Even as couched in these broad terms, however, it can be seen that this facet of the invention advances the art—supplying in essence the same advantages discussed above for the second aspect.

In preferred embodiments of its fourth major independent facet or aspect, the invention is an incremental-printing image-preparation method, for accommodating personnel who are accustomed to thinking in terms of ink combinations rather than in terms of numerical perceptual color models. The image is to be printed based upon an original image data file that substantially expressly represents inking to be used.

The method includes the step of receiving from those personnel an indication of quantity of black ink and other inks desired, in the form of at least four color separations, for use in incremental printing. The method also includes the step of—in preparing for incremental printing—directly and automatically implementing changes in represented quantity of black ink, for colors that initially have black ink.

The foregoing may represent a description or definition of the fourth aspect or facet of the invention in its broadest or most general form. Even as couched in these broad terms, however, it can be seen that this facet of the invention importantly advances the art.

In particular, the invention as considered in this fourth aspect addresses incremental-printing needs of a very large number of people initially trained in the traditional field of graphic arts and offset (or even letterpress) printing. As roted in the earlier "Background" section of this document, that training was extremely extensive and developed many sophisticated and highly elaborated approaches to colorant design.

Those approaches unfortunately cannot be realized within the framework of the more modernly arrived incremental printing—which instead of inking concepts has focused upon theoretically better-grounded perceptual-color concepts. Despite the fact that such modern approaches may be better in theory, they are quite alien to those artisans who came up through the traditional printing arts.

Furthermore a second look at those classical concepts of color management reveals that there was more to them than some perceptual-color theoreticians may have recognized, or wanted to recognize (within the limited context of preprinting analysis for incremental printing, as discussed earlier). In particular, as also noted earlier, it is possible to verify objectively the idea that overprinting black ink with, for example, a magenta tone can create a rich, somehow more profound visual experience—at least for some subpopulation of viewers.

Hence this fourth aspect of the invention extends the capability of many highly trained and experienced people to create in incremental printing what they have long been able to create with a printing press. Conversely it also extends the utility of incremental printing to encompass the capabilities of those people trained classically.

Although the fourth major aspect of the invention thus significantly advances the art, nevertheless to optimize enjoyment of its benefits preferably the invention is practiced in conjunction with certain additional features or characteristics. In particular, preferably the change-implementing step includes automatic reduction of black ink represented in the data, primarily in highlight and midtone regions of the image, to mitigate graininess in those regions.

In the classical printing art, due to differences in dot-placement accuracy, inks and printing media, as noted earlier such adjustment was less important than it is in incremental printing and therefore was omitted from the traditional training for at least many workers. A relatively small number of personnel, however, may possibly have learned to substitute chromatic colorants for black in highlight regions—particularly for applications such as fine-art reproduction work. In any event it is an enhancement to the efforts of ink-thinking artisans in general.

In preferred embodiments of its fifth major independent facet or aspect, as for the sixth, the invention is an incremental-printing image-preparation method, for accommodating personnel who are accustomed to thinking in terms of ink combinations rather than in terms of numerical perceptual color models. As before, the image is to be printed based upon an original image data file that substantially expressly represents inking to be used.

The method includes the step of receiving from those personnel an indication of change in quantity of black ink desired, in incremental printing. It also includes the step of directly implementing the indicated change, in preparing for incremental printing.

The foregoing may represent a description or definition of the fifth aspect or facet of the invention in its broadest or most general form. Even as couched in these broad terms, however, it can be seen that this facet of the invention importantly advances the art.

In particular, this fifth aspect of the invention in a sense goes a step beyond what is accomplished in the fourth aspect. Whereas the fourth aspect simply accepts color separations as classically prepared by a traditionally trained graphic artist, the fifth aspect allows that artist to make adjustments in the inking directly and look at the results as printed.

Although the fifth major aspect of the invention thus significantly advances the art, nevertheless to optimize enjoyment of its benefits preferably the invention is practiced in conjunction with certain additional features or characteristics. In particular, preferably the indication is substantially without reference to any perceptual color model.

In another basic preference, the implementing step includes automatic adjustment in quantities of chromatic inks, compensating for the indicated change in quantity of black ink. This compensating comprises substantially maintaining tonal values in areas of ink change; and the method also includes the step of applying the data file with the implemented change, to printmasking for hardcopy printing.

In preferred embodiments of its sixth major independent facet or aspect, the invention is an incremental printing system for forming an image by construction from dots deposited on a printing medium, based upon original image data in device-color space. The system operates under control of a user.

It includes a direct device-color to device-color graphical computer interface module for enabling the user to modify color image data in preparation for printing, without requiring the user to directly manipulate perceptual color parameters. It also includes an output incremental printing stage for printing the image from the modified data.

The foregoing may represent a description or definition of the sixth aspect or facet of the invention in its broadest or most general form. Even as couched in these broad terms, however, it can be seen that this facet of the invention importantly advances the art.

In particular, the advantages of this aspect of the invention are closely similar to those of the fifth facet, but arise from an implementation of the invention as apparatus rather than as a method. Although the sixth major aspect of the invention thus significantly advances the art, nevertheless to optimize enjoyment of its benefits preferably the invention is practiced in conjunction with certain additional features or characteristics.

In particular, preferably the interface includes controls that enable the user to set—substantially directly—both a black-onset point; and an increasing function of an initial amount of black ink, for black-containing colors darker than the black-onset point. In this case it is further preferable that the interface further include controls that enable the user to substantially directly set merging of the above-described function with a black-identity function in darkest regions of the image.

All of the foregoing operational principles and advantages of the present invention will be more fully appreciated upon consideration of the following detailed description, with reference to the appended drawings, of which:

BRIEF DESCRIPTION OF THE DRAWINGS

(In FIG. 5, two processing paths 74, 191ch–194ch shown in FIG. 4 are drawn cut away at 187 for reasons explained in the text.)

DETAILED DESCRIPTION OF THE PREFERRED EMBODIMENTS

1. All-Device-Space Automatic Black Replacement

Figure 1:
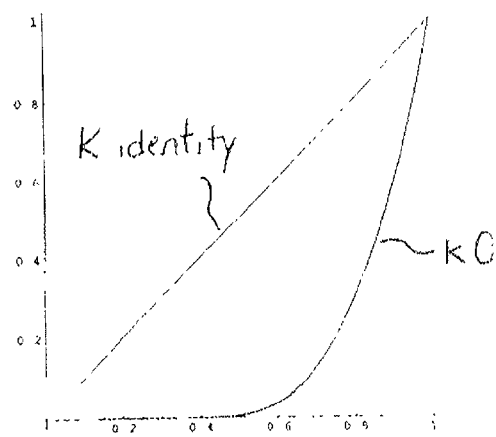
FIG. 1 is a graph of an initial K function used in generating black replacement functions $ABR_N(K)$; and with a black-identity function also shown for reference.

Preferred embodiments of the present invention provide the black replacement which is needed in inkjet and some other incremental-printing systems—but do so without leaving the device-space regime. Thus these embodiments can take the form of a direct CMYK-to-CMYK transform inserted in the device color path to perform automatic black replacement.

As the preferred embodiments perform automatic black replacement entirely within device space, they may be denominated "all-device-space automatic black replacement" or "ADSABR". This invention thereby resolves all the problems described in the earlier "Background" section of this document.

ADSABR substitutes color inks for black in the highlights and midtones while maintaining pure device colors—i. e. this process by definition never goes into three-color space but rather always remains in four-space. Furthermore it performs this substitution while refraining from altering any purely chromatic input color. In other words, the invention does not affect any input color that contains no black.

2. Problems Solved, and Prior-Art Attempts

A six-color printer or raster image processor (RIP) that uses light colorants in a CMYKcm configuration—the lower-case letters denoting dilute or "light" colorants—is unbalanced in the sense that the darkest ink, K, has no light counterpart as do the M and C inks. To avoid a grainy appearance, however, full-strength K ink must not be used in highlight image areas.

For printers with an RGB-only interface, the use of K ink(s) can be controlled through the colormap; but for graphic-arts printers that provide a device-color CMYK interface, colormap solutions are not possible—since the input is preseparated and (as noted earlier) device colors do not pass through colormaps. ADSABR resolves this quandary through use of a direct CMYK-to-CMYK transform inserted in the device color path.

Restated, two types of prior solutions have been applied to the problem of highlight/midtone graininess in incremental printing:

for RGB-only printers, K ink use is controlled in the colormap—a solution inapplicable to CMYK device color, which cannot pass through a colormap; and for CMYK printers, solutions have been implemented that convert CMYK to CMY or RGB first, and then apply black generation as usual (UCR otherwise)—and this processing affects all colors, even those that contain no K on input, so that the user loses control over black generation, and for instance the distinction between CMY and pure-K grays disappears.

Such loss of black-generation control and disappearance of the CMY/pure-K distinction are undesirable both because of graininess as such and also because of its aggravation in current inkjet systems by the relatively poorer image quality of K pens discussed above. Another problem discussed earlier is the occurrence of some color changes in the output.

ADSABR resolves all these difficulties by substituting CMY for K only when necessary—i. e. for colors that do contain K on input—and by otherwise maintaining for the user the maximum possible control over device color. In the most highly preferred embodiment, the user can exercise this control simply by the classical method of preparing four-color separations.

In alternative preferred embodiments, the user can exercise control over black generation by operating a manual override control. As will be seen, such a control is readily provided in the printing system as for example through a graphical user interface running in an associated computer.

3. Algorithmic Basis

ADSABR is the approach finally adopted by the present inventors for use in a current product of the assignee, the Hewlett Packard Company. ADSABR is a direct 4-to-4 transform: all colors that have no K pass through this transform unmodified, and in the other colors K is replaced by CMY, mainly in the highlights and midtones.

While the most-straightforward implementation may be real-time calculation, considerable computation time during incremental-printer operation can be saved by substituting lookup-table equivalents. Once ADSABR tables have been defined, they are indexed by the input quantity K of black ink.

In use, each input K value specified by four-color-separations is then found in the table—or directly by computation—and four corresponding replacement numbers $ABR_C(K)$, $ABR_M(K)$, $ABR_Y(K)$ and $ABR_K(K)$ from the table or computation are used. These numbers are not the actual output colors to be printed, but will be used in deriving those output colors as shown below. Each of these ABR (automatic black replacement) numbers may be called a "replacement function" for a corresponding color plane C, M, Y or K respectively.

(a) Recombination—Development of the output numbers will be described shortly, but it is helpful to first jump ahead and see how they are preferably used. These output numbers are recombined with the original colors C, M, Y and K in an inverse proportional way to obtain the actual output colors C', M', Y' and K':

$$C' = C + (1-C) \cdot ABR_C(K)$$

$$M' = M + (1-M) \cdot ABR_M(K)$$

$$Y' = Y + (1-Y) \cdot ABR_Y(K)$$

$$K' = ABR_K(K)$$

In these four formulas, as above each of the expressions $ABR_N(K)$ represents a specific automatic black replacement function for device-color plane "N" (that is, for C, M, Y or K respectively). Of the four functions, the function $ABR_K(K)$ for K itself is central—and its development will be discussed with particular attention below.

With the ADSABR tables constrained to hold $ABR_K(0) = 0$, the desired passthrough behavior is ensured for colors that initially have no K. ADSABR functions, and their use in generation of ADSABR tables, resemble the generation of conventional UCR tables, with some subtle but significant differences. The first step consists in defining an initial ABR function k0 that will be used to constrain the solution:

(b) The initial form k0—Choose an initial form of black-generation function k0 (K) as shown below, the argument K being the input quantity of black:

$$k0(K) = 0 \quad \text{for } K < S,$$
$$= L \cdot \left(\frac{K-S}{1-S}\right)^P \quad \text{for } K \geq S$$

in which
S is the K-onset value,
L is the K-limit value, and
P is an exponent that determines the acceleration of output black in response to input black, above the onset value.

In essence the function k0 (K) is simply an increasing function of K. One such function that has been found particularly effective and versatile, however, is a function with a generalized exponent, as shown—that can be adjusted continuously among a great many possible values.

In practice, values exceeding unity, and preferably exceeding two, appear to be ideal. Analogously to development of UCR tables, choice of this initial black-generation function is critical to generating good ADSABR values, whether accomplished directly or through tables.

Inserting preferred magnitudes for the above parameters—S=0.4, L=1 and P=3—the resulting function (FIG. 1) is typical for a six-color printer with the usual C, M, Y and K colorants, and also light C and light M. It is the nonzero value for the onset parameter S that reflects the system designer's decision to delay the onset of true K ink in order to reduce the graininess of highlights and midtones.

In other words, all blacks below the onset value S are rendered as process (CMY) black. As will be recalled, a major motivation for the present invention is to restore to ink-thinkers the control they are accustomed to exerting over black ink. It may therefore appear ironic that development of the black-generation function—for the particular preferred embodiment under discussion—begins with, and focuses strongly upon, a designed-in mechanism for removing such control.

As explained earlier, however, inkjet and some other incremental printing systems are susceptible to undesired graininess in highlights and midtones, whereas a major thrust of the control-restoration philosophy revolves around overprinting chromatic shades in conjunction with black and dark grays. Thus the embodiment of the invention represented in FIG. 1 attempts to restore control over black at the black end of the tonal range, where it is of greatest importance in classical (printing press) work, while at the same time curing the graininess problem that is a dominant concern in this technology.

In other words, the invention represents an effort to accommodate these two partly conflicting principles. (In alternative preferred embodiments the system operator may have a control switch for use in disabling the onset function so that the black response over the entire range is identical to the black input.)

It has been found, however, that better ADSABR tables are generated when the K function joins the K identity function near the full-black point—i. e. within the shadow end of the overall input-black range—rather than only at the full-black point. Such a merging of the K function with the identity function enables the system to invoke pure K without undercolor in the deep shadows (and also for pure-K text and line art).

This result smoothly integrates the desired highlight behavior with classical treatment of pure black ink in deep shadow. If, however, the graphic artist or technician has specified overprinting of an additional chromatic shade as discussed earlier, the response protocol under description preserves such overprinting.

This enhanced form of the invention can be achieved by a linear combination of the K function shown above with the identity function, as demonstrated below.

(c) A refined form k1—Choose a variant form k1 (K) of black-generation function:

$$k1(K) = 0 \quad \text{for } K < S,$$
$$= k0 \cdot \left[1 - \left(\frac{K-S}{M-S}\right)\right] + K \cdot \left(\frac{K-S}{M-S}\right) \quad \text{for } S \leq K \leq M,$$
$$= K \quad \text{for } S > M,$$

where M is the "merge point"—at which the new K function is to merge with the identity function—and k0 and the other variables are as defined earlier.

Figure 2:
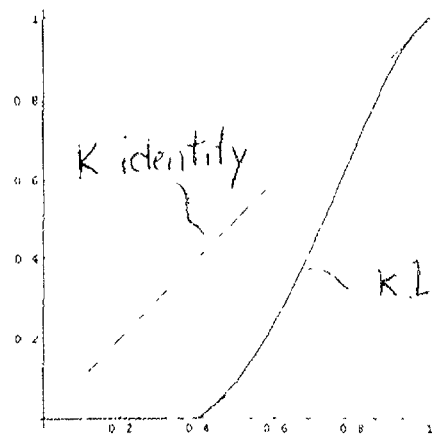
FIG. 2 is a like graph of a linear combination of the FIG. 1 function with the identity function, and again with the identity function also shown.

With k1 defined as above and again a preferred value for the new parameter S=0.95 (FIG. 2), the proportion of K–S to M–S (a proportion that appears twice in the expression for k1) serves to moderate the midtone behavior, smoothly blending the intermediate curve into both pure k0 (and thereby output K=0) at the lower end and pure black at the upper. Thus when K is above the onset point S by only a small fraction of the interval from S to the merge point M, the ratio of K–S to M–S is very small, and only that very small fraction is subtracted (inside the square brackets) from unity—leaving the first term very nearly equal to the previously discussed function k0.

In that part of the range, however, by virtue of that same very small ratio, the second term is quite small and k1 is not drawn significantly toward the identity value K. When K is almost at the merge point M, these relationships are reversed, so that the first term approaches zero while the second closely approximates the identity function K.

Once the K function $ABR_K(K)$ is defined, the CMY functions are obtained through numerical optimization, similar to the conventional process for UCR tables. The objective function being minimized is calorimetric difference between (1) the resulting CMYK colors that correspond to a pure K input ramp, and (2) the actual color of a pure K ramp.

Optionally it can also be attempted to gray-balance the result, using only the L* component of the pure K ramp and setting the a* and b* components to zero. For the previously mentioned current product this was not done, since the goal was to affect color as little as possible while still reducing K graininess and banding.

(d) Numerical optimization for CMY functions—In pseudocode, the optimization process looks for example like this iterative algorithm, performed for a moderate number of control points:

let pitch=1/32
    solution=(0,0,0)
    K=pitch
    minimize dE[fwd(0,0,0,K), fwd(c,m,y,k1(K))]
    variables: c,m,y
    starting values: solution
    let solution=(c,m,y) corresponding to minimum found
    let K=K+pitch
    repeat until K=1-pitch.

In this notation, each of the two functions called out as "fwd" is a so-called "forward printer model". Although the concept and use of a forward printer model is known in the art, for completeness a very brief orientation appears in subsection (e) below.

Figure 3:
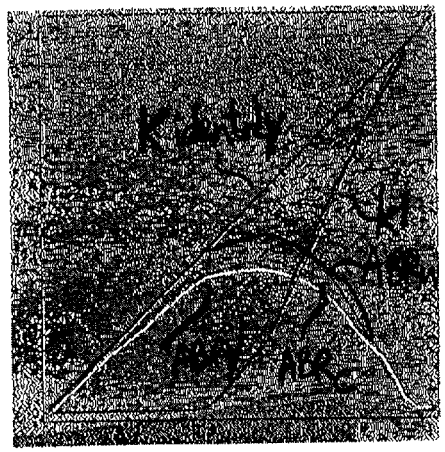
FIG. 3 is a graph of ABR functions for four colors, as used in a current product—again, shown together with the identity function.

For the previously mentioned current product, with a standard glossy printing medium and the k1 function shown in subsection (c) above, the four resulting ADSABR functions (FIG. 3) are the solution found by this iteration.

When the input is a pure K ramp, the output is identical to the ADSABR functions. When the input contains no K or any color with one hundred percent K, the input passes through unmodified. When the input contains colors with a K component between zero and one hundred percent, the K component is partially substituted with CMY, using the proportional-recombination formulas described in subsection (a) above.

(e) Forward printer models—Such a model relates device-independent color coordinates, such as CIELAB coordinates, to device-dependent color coordinates such as CMYK, and can be expressed as a simple function:

$$fwd(c,m,y,k)=(L,a,b).$$

These models are commonly used—as in the iterative algorithm exhibited above—to evaluate the effect of various types of black treatment on image quality, and to generate parameters or tables for the various models.

In some cases, rather than using a single function as shown above it is more convenient to consider each of the CIELAB dimensions separately. The expressions may then take this form:

$$fL(c,m,y,k)=L$$

$$fa(c,m,y,k)=a$$

$$fb(c,m,y,k)=b.$$

Such models can be generated by conventional device-profiling software such as ColorSavvy RTKit (ProfilePrinter Deluxe), or constructed directly on the basis of colorimetric measurements, e. g. using Mathematica or Matlab. For the algorithm described here, the inventors have performed the modeling using Mathematica, and based on either IT8.7/3 measurements or equally-spaced CMYK measurements.

The inventors' models all used linear interpolation, and were all of the relative-colorimetric kind. In other words, the white-point reference is the unprinted printing medium—i. e., the blank paper (or other medium) always corresponds to CIELAB(100,0,0).

(f) ADSABR benefits and limitations—The inventors have evaluated a number of different ways of replacing pure K for incremental printers with CMYK device-color support. For the current product ADSABR was found to work best, for the following reasons.

It does not modify colors that do not contain K, and does not modify one hundred percent K—and thus it is the least impacting of the options. This is important for graphic-arts markets, in which designers and printers are accustomed to having complete control over device colors.

In the intermediate black tonal range, it allows some measure of control over black generation for the user. Black generation is one of the most important control functions in printer-profile generation, and one for which look, feel and personal preferences play an important role.

Traditional approaches such as UCR divest the user of all control over black generation. That is a definite disadvantage for graphic-arts markets.

It allows pure K to be replaced with CMY in midtones and highlights, in order to reduce graininess and/or mask banding or other artifacts that may be more visible in K than in other colors. This accommodation of incremental-printing limitations appears both very important and also acceptable to the great majority of graphic-arts designers and printers—and furthermore can be made optional.

Achieving the best mode of practice for this invention does require a thoughtful understanding of certain limitations of the ADSABR technique:

Highlight regions of pure-K grayscale images are transformed to four-color grayscale, which not only increases ink usage but may also create problems with gray balance.

Careful trial-and-error work is necessary to provide ADSABR tables that do not introduce problems with gray balance in general, or introduce artifacts in gradients. In particular, optimization is often fussy for gradients that move to or from combinations of a highly saturated primary or secondary with a considerable amount of K.

If ADSABR is applied to the CMYK output of a printer profile (either internal or external to the printer), it will cascade with the black generation of the profile and delay the onset of K more than what that profile specifies. This may lead to problems with any profile that uses, in the vernacular, very "short" black. Such application is not intended.

On balance, ADSABR is a reasonable middleground approach to dealing with device-color control vs. graininess in six-color low-dyes printers.

4. Lookup-Table Implementation

Subsections (a) through (c) above can be understood to describe computations actually performed in a production printer, in the field, when assigned the task of printing an image from four-color separations or equivalent data inputs. The same subsections can equally well be understood as describing computations performed only at the factory, in a representative or prototype printer, for the purpose of developing lookup tables from which the results of the computations can then be looked up, in the field, by each printer in a model line of printers—in lieu of performing the actual calculations over and over.

Thus instead of programming each production printer to perform the calculations, this form of the invention calls for programming of each production printer to look up the answers in the lookup tables. Programming to produce either procedure is well within the capability of a competent senior programmer experienced in this field, given the instructions presented in this document.

The development of all four ABR(K) functions, and therefore the preparation of lookup tables, is taught in the preceding subsection 3. Nevertheless it may be helpful to some people of ordinary skill in the art to see finished sets of the tables—which can alternatively be regarded as data corresponding to ABR curves of FIG. 3.

The following two tables are for glossy and coated media respectively, for all 256 levels (8 bit) of K input. The format is the usual C, M, Y, K—expressed in the range from zero through 255 —on each line. Each table contains 256 lines, the first line corresponding to input zero and the last to input 255.

| glossy stock | | | |
|---|---|---|---|
| 0 | 0 | 0 | 0 |
| 1 | 1 | 1 | 0 |
| 2 | 2 | 2 | 0 |
| 3 | 3 | 4 | 0 |
| 4 | 4 | 5 | 0 |
| 5 | 5 | 6 | 0 |
| 6 | 6 | 7 | 0 |
| 7 | 7 | 8 | 0 |
| 8 | 8 | 10 | 0 |
| 9 | 9 | 11 | 0 |
| 10 | 10 | 12 | 0 |
| 11 | 11 | 13 | 0 |
| 12 | 12 | 15 | 0 |
| 13 | 13 | 16 | 0 |
| 14 | 14 | 17 | 0 |
| 15 | 15 | 18 | 0 |
| 16 | 16 | 19 | 0 |
| 17 | 17 | 21 | 0 |
| 18 | 19 | 22 | 0 |
| 19 | 20 | 23 | 0 |
| 20 | 21 | 24 | 0 |
| 21 | 22 | 25 | 0 |
| 22 | 23 | 26 | 0 |
| 23 | 25 | 27 | 0 |
| 24 | 26 | 28 | 0 |
| 25 | 27 | 29 | 0 |
| 26 | 28 | 30 | 0 |
| 27 | 29 | 31 | 0 |
| 28 | 30 | 32 | 0 |
| 29 | 31 | 33 | 0 |
| 30 | 32 | 34 | 0 |
| 31 | 33 | 35 | 0 |
| 32 | 34 | 36 | 0 |
| 33 | 35 | 37 | 0 |
| 34 | 36 | 37 | 0 |
| 35 | 37 | 38 | 0 |
| 36 | 38 | 39 | 0 |
| 37 | 39 | 40 | 0 |
| 38 | 40 | 41 | 0 |
| 39 | 41 | 42 | 0 |
| 40 | 42 | 43 | 0 |
| 41 | 44 | 44 | 0 |
| 42 | 45 | 45 | 0 |
| 43 | 46 | 46 | 0 |
| 44 | 47 | 47 | 0 |
| 45 | 48 | 48 | 0 |
| 46 | 49 | 49 | 0 |
| 47 | 50 | 50 | 0 |
| 48 | 51 | 51 | 0 |
| 49 | 52 | 51 | 0 |
| 50 | 53 | 52 | 0 |
| 51 | 54 | 53 | 0 |
| 52 | 55 | 54 | 0 |
| 52 | 56 | 55 | 0 |
| 53 | 57 | 56 | 0 |
| 54 | 58 | 57 | 0 |
| 55 | 59 | 57 | 0 |
| 56 | 60 | 58 | 0 |
| 57 | 61 | 59 | 0 |
| 58 | 62 | 60 | 0 |
| 59 | 63 | 61 | 0 |
| 60 | 64 | 61 | 0 |
| 61 | 65 | 62 | 0 |
| 62 | 66 | 63 | 0 |
| 63 | 67 | 64 | 0 |
| 63 | 68 | 65 | 0 |
| 64 | 69 | 65 | 1 |
| 65 | 70 | 66 | 1 |
| 65 | 70 | 66 | 2 |
| 66 | 71 | 67 | 2 |
| 67 | 72 | 68 | 2 |
| 68 | 73 | 68 | 3 |
| 68 | 73 | 69 | 3 |
| 69 | 74 | 70 | 4 |
| 70 | 75 | 70 | 4 |
| 70 | 76 | 71 | 5 |
| 71 | 76 | 71 | 5 |
| 71 | 77 | 72 | 6 |
| 72 | 78 | 73 | 6 |
| 73 | 78 | 73 | 7 |
| 73 | 79 | 74 | 7 |
| 74 | 80 | 74 | 8 |
| 75 | 81 | 75 | 9 |
| 75 | 81 | 75 | 9 |
| 76 | 82 | 76 | 10 |
| 76 | 82 | 77 | 10 |
| 77 | 83 | 77 | 11 |
| 78 | 84 | 78 | 12 |
| 78 | 84 | 78 | 12 |
| 79 | 85 | 79 | 13 |
| 79 | 86 | 79 | 14 |
| 80 | 86 | 80 | 15 |
| 80 | 87 | 80 | 15 |
| 81 | 87 | 81 | 16 |
| 82 | 88 | 81 | 17 |
| 82 | 89 | 82 | 17 |
| 83 | 89 | 83 | 18 |
| 83 | 90 | 83 | 19 |
| 84 | 90 | 83 | 20 |
| 84 | 91 | 84 | 21 |
| 85 | 91 | 84 | 22 |
| 85 | 92 | 85 | 23 |
| 86 | 93 | 85 | 23 |
| 86 | 93 | 86 | 24 |
| 87 | 94 | 86 | 25 |
| 87 | 94 | 87 | 26 |
| 88 | 95 | 87 | 27 |
| 88 | 95 | 88 | 28 |
| 89 | 96 | 88 | 29 |
| 89 | 96 | 89 | 30 |
| 89 | 97 | 89 | 31 |
| 90 | 97 | 90 | 32 |
| 90 | 97 | 90 | 33 |
| 91 | 98 | 90 | 34 |
| 91 | 98 | 91 | 35 |
| 92 | 99 | 91 | 36 |
| 92 | 99 | 92 | 38 |
| 93 | 100 | 92 | 39 |
| 93 | 100 | 92 | 40 |
| 93 | 100 | 93 | 41 |
| 94 | 101 | 93 | 42 |
| 94 | 101 | 94 | 43 |
| 95 | 101 | 94 | 45 |
| 95 | 102 | 94 | 46 |
| 95 | 102 | 95 | 47 |
| 96 | 102 | 95 | 48 |

-continued

| | glossy stock | | |
|---|---|---|---|
| 96 | 103 | 95 | 50 |
| 97 | 103 | 96 | 51 |
| 97 | 103 | 96 | 52 |
| 97 | 103 | 96 | 53 |
| 97 | 103 | 96 | 55 |
| 97 | 103 | 97 | 56 |
| 98 | 104 | 97 | 58 |
| 98 | 104 | 97 | 59 |
| 98 | 104 | 97 | 60 |
| 98 | 104 | 98 | 62 |
| 98 | 104 | 98 | 63 |
| 98 | 104 | 98 | 65 |
| 99 | 104 | 98 | 66 |
| 99 | 104 | 98 | 68 |
| 99 | 104 | 98 | 69 |
| 99 | 103 | 98 | 70 |
| 99 | 103 | 99 | 72 |
| 99 | 103 | 99 | 73 |
| 99 | 103 | 99 | 75 |
| 99 | 103 | 99 | 77 |
| 99 | 103 | 99 | 78 |
| 99 | 103 | 99 | 80 |
| 100 | 103 | 100 | 81 |
| 100 | 103 | 100 | 83 |
| 100 | 103 | 100 | 84 |
| 100 | 102 | 100 | 86 |
| 100 | 102 | 100 | 88 |
| 100 | 102 | 100 | 89 |
| 100 | 102 | 100 | 91 |
| 100 | 101 | 100 | 93 |
| 100 | 101 | 101 | 94 |
| 100 | 101 | 101 | 96 |
| 100 | 101 | 101 | 98 |
| 100 | 100 | 101 | 99 |
| 100 | 100 | 101 | 101 |
| 100 | 99 | 101 | 103 |
| 100 | 99 | 100 | 105 |
| 99 | 98 | 100 | 106 |
| 99 | 98 | 100 | 108 |
| 99 | 97 | 100 | 110 |
| 99 | 97 | 100 | 112 |
| 99 | 96 | 99 | 113 |
| 99 | 95 | 99 | 115 |
| 99 | 95 | 99 | 117 |
| 99 | 94 | 99 | 119 |
| 98 | 93 | 98 | 121 |
| 98 | 92 | 98 | 122 |
| 98 | 92 | 98 | 124 |
| 98 | 91 | 97 | 126 |
| 98 | 90 | 97 | 128 |
| 98 | 89 | 97 | 130 |
| 97 | 88 | 96 | 132 |
| 97 | 87 | 96 | 133 |
| 97 | 87 | 96 | 135 |
| 97 | 86 | 95 | 137 |
| 96 | 85 | 95 | 139 |
| 96 | 84 | 95 | 141 |
| 96 | 83 | 94 | 143 |
| 96 | 82 | 94 | 145 |
| 95 | 81 | 93 | 146 |
| 95 | 79 | 93 | 148 |
| 95 | 78 | 92 | 150 |
| 95 | 77 | 92 | 152 |
| 94 | 76 | 92 | 154 |
| 94 | 75 | 91 | 156 |
| 94 | 73 | 91 | 158 |
| 94 | 72 | 90 | 160 |
| 93 | 70 | 89 | 161 |
| 93 | 69 | 89 | 163 |
| 93 | 67 | 88 | 165 |
| 93 | 65 | 87 | 167 |
| 93 | 64 | 87 | 169 |
| 92 | 62 | 86 | 171 |
| 92 | 60 | 86 | 173 |
| 92 | 58 | 85 | 174 |
| 92 | 56 | 84 | 176 |
| 91 | 53 | 83 | 178 |

-continued

| | glossy stock | | |
|---|---|---|---|
| 91 | 51 | 83 | 180 |
| 91 | 49 | 82 | 182 |
| 90 | 46 | 81 | 184 |
| 90 | 44 | 80 | 185 |
| 90 | 42 | 79 | 187 |
| 89 | 39 | 79 | 189 |
| 89 | 36 | 78 | 191 |
| 89 | 33 | 77 | 193 |
| 88 | 30 | 76 | 194 |
| 88 | 28 | 75 | 196 |
| 88 | 25 | 75 | 198 |
| 87 | 22 | 74 | 200 |
| 87 | 19 | 73 | 201 |
| 87 | 17 | 72 | 203 |
| 87 | 15 | 72 | 205 |
| 87 | 13 | 71 | 206 |
| 87 | 12 | 71 | 208 |
| 88 | 10 | 70 | 210 |
| 88 | 8 | 70 | 211 |
| 88 | 6 | 69 | 213 |
| 88 | 4 | 69 | 215 |
| 89 | 3 | 68 | 216 |
| 90 | 3 | 68 | 218 |
| 90 | 2 | 68 | 219 |
| 91 | 2 | 67 | 221 |
| 92 | 2 | 67 | 223 |
| 93 | 1 | 66 | 224 |
| 94 | 1 | 66 | 226 |
| 94 | 0 | 66 | 227 |
| 96 | 0 | 65 | 229 |
| 97 | 0 | 65 | 230 |
| 99 | 0 | 65 | 231 |
| 101 | 0 | 65 | 233 |
| 102 | 0 | 64 | 234 |
| 104 | 0 | 64 | 235 |
| 106 | 0 | 64 | 237 |
| 107 | 0 | 64 | 238 |
| 111 | 0 | 64 | 239 |
| 115 | 0 | 65 | 240 |
| 119 | 0 | 66 | 242 |
| 122 | 0 | 67 | 243 |
| 126 | 0 | 68 | 244 |
| 130 | 0 | 69 | 245 |
| 134 | 0 | 70 | 246 |
| 137 | 0 | 71 | 247 |
| 141 | 0 | 72 | 248 |
| 145 | 0 | 73 | 249 |
| 149 | 0 | 74 | 250 |
| 153 | 0 | 75 | 251 |
| 156 | 0 | 76 | 252 |
| 160 | 0 | 77 | 253 |
| 164 | 0 | 78 | 254 |
| 168 | 0 | 79 | 255 |

| | coated stock | | |
|---|---|---|---|
| 0 | 0 | 0 | 0 |
| 1 | 1 | 1 | 0 |
| 1 | 2 | 2 | 0 |
| 2 | 2 | 3 | 0 |
| 3 | 3 | 3 | 0 |
| 4 | 4 | 4 | 0 |
| 4 | 5 | 5 | 0 |
| 5 | 5 | 6 | 0 |
| 6 | 6 | 7 | 0 |
| 6 | 7 | 8 | 0 |
| 7 | 8 | 9 | 0 |
| 8 | 9 | 10 | 0 |
| 8 | 9 | 10 | 0 |
| 9 | 10 | 11 | 0 |
| 10 | 11 | 12 | 0 |
| 11 | 12 | 13 | 0 |

-continued coated stock

| | | | |
|---|---|---|---|
| 11 | 13 | 14 | 0 |
| 12 | 13 | 15 | 0 |
| 13 | 14 | 16 | 0 |
| 13 | 15 | 16 | 0 |
| 14 | 16 | 17 | 0 |
| 15 | 17 | 18 | 0 |
| 15 | 17 | 19 | 0 |
| 16 | 18 | 20 | 0 |
| 17 | 19 | 21 | 0 |
| 18 | 20 | 22 | 0 |
| 18 | 21 | 22 | 0 |
| 19 | 21 | 23 | 0 |
| 20 | 22 | 24 | 0 |
| 20 | 23 | 25 | 0 |
| 21 | 24 | 26 | 0 |
| 22 | 24 | 27 | 0 |
| 23 | 25 | 27 | 0 |
| 23 | 26 | 28 | 0 |
| 24 | 27 | 29 | 0 |
| 25 | 28 | 29 | 0 |
| 25 | 28 | 30 | 0 |
| 26 | 29 | 31 | 0 |
| 27 | 30 | 31 | 0 |
| 27 | 31 | 32 | 0 |
| 28 | 31 | 33 | 0 |
| 29 | 32 | 33 | 0 |
| 29 | 33 | 34 | 0 |
| 30 | 34 | 34 | 0 |
| 31 | 34 | 35 | 0 |
| 32 | 35 | 36 | 0 |
| 32 | 36 | 36 | 0 |
| 33 | 37 | 37 | 0 |
| 34 | 37 | 37 | 0 |
| 34 | 38 | 38 | 0 |
| 35 | 39 | 39 | 0 |
| 36 | 40 | 39 | 0 |
| 36 | 41 | 40 | 0 |
| 37 | 41 | 40 | 0 |
| 38 | 42 | 41 | 0 |
| 38 | 43 | 42 | 0 |
| 39 | 44 | 42 | 0 |
| 40 | 44 | 43 | 0 |
| 41 | 45 | 43 | 0 |
| 41 | 46 | 44 | 0 |
| 42 | 47 | 44 | 0 |
| 43 | 48 | 45 | 0 |
| 43 | 48 | 46 | 0 |
| 44 | 49 | 46 | 0 |
| 45 | 50 | 47 | 0 |
| 45 | 50 | 47 | 0 |
| 45 | 51 | 47 | 1 |
| 46 | 52 | 48 | 1 |
| 46 | 52 | 48 | 2 |
| 47 | 53 | 48 | 2 |
| 47 | 53 | 49 | 2 |
| 48 | 54 | 49 | 3 |
| 48 | 54 | 49 | 3 |
| 49 | 55 | 50 | 4 |
| 49 | 56 | 50 | 4 |
| 50 | 56 | 50 | 5 |
| 50 | 57 | 50 | 5 |
| 51 | 57 | 51 | 6 |
| 51 | 58 | 51 | 6 |
| 52 | 58 | 51 | 7 |
| 52 | 59 | 52 | 7 |
| 53 | 59 | 52 | 8 |
| 53 | 59 | 52 | 9 |
| 54 | 60 | 52 | 9 |
| 54 | 60 | 53 | 10 |
| 55 | 61 | 53 | 10 |
| 55 | 61 | 53 | 11 |
| 56 | 62 | 53 | 12 |
| 56 | 62 | 54 | 12 |
| 57 | 62 | 54 | 13 |
| 57 | 63 | 54 | 14 |
| 58 | 63 | 54 | 15 |
| 58 | 63 | 54 | 15 |

-continued coated stock

| | | | |
|---|---|---|---|
| 59 | 64 | 55 | 16 |
| 59 | 64 | 55 | 17 |
| 60 | 64 | 55 | 17 |
| 60 | 65 | 55 | 18 |
| 60 | 65 | 56 | 19 |
| 61 | 65 | 56 | 20 |
| 61 | 66 | 56 | 21 |
| 62 | 66 | 56 | 22 |
| 62 | 66 | 56 | 23 |
| 63 | 66 | 56 | 23 |
| 63 | 67 | 57 | 24 |
| 63 | 67 | 57 | 25 |
| 64 | 67 | 57 | 26 |
| 64 | 67 | 57 | 27 |
| 64 | 67 | 57 | 28 |
| 65 | 68 | 57 | 29 |
| 65 | 68 | 57 | 30 |
| 65 | 68 | 57 | 31 |
| 66 | 68 | 58 | 32 |
| 66 | 68 | 58 | 33 |
| 66 | 68 | 58 | 34 |
| 67 | 68 | 58 | 35 |
| 67 | 69 | 58 | 36 |
| 67 | 69 | 58 | 38 |
| 68 | 69 | 58 | 39 |
| 68 | 69 | 58 | 40 |
| 68 | 69 | 58 | 41 |
| 68 | 69 | 58 | 42 |
| 69 | 69 | 58 | 43 |
| 69 | 69 | 58 | 45 |
| 69 | 69 | 58 | 46 |
| 69 | 69 | 58 | 47 |
| 70 | 69 | 58 | 48 |
| 70 | 69 | 58 | 50 |
| 70 | 69 | 58 | 51 |
| 70 | 69 | 58 | 52 |
| 71 | 68 | 58 | 53 |
| 71 | 68 | 58 | 55 |
| 71 | 68 | 58 | 56 |
| 71 | 68 | 58 | 58 |
| 71 | 68 | 58 | 59 |
| 71 | 68 | 58 | 60 |
| 71 | 68 | 57 | 62 |
| 71 | 68 | 57 | 63 |
| 72 | 68 | 57 | 65 |
| 72 | 68 | 57 | 66 |
| 72 | 67 | 57 | 68 |
| 72 | 67 | 57 | 69 |
| 72 | 67 | 57 | 70 |
| 72 | 67 | 57 | 72 |
| 72 | 67 | 56 | 73 |
| 72 | 66 | 56 | 75 |
| 72 | 66 | 56 | 77 |
| 72 | 66 | 56 | 78 |
| 72 | 65 | 55 | 80 |
| 72 | 65 | 55 | 81 |
| 72 | 65 | 55 | 83 |
| 72 | 64 | 55 | 84 |
| 72 | 64 | 55 | 86 |
| 72 | 64 | 54 | 88 |
| 72 | 63 | 54 | 89 |
| 72 | 63 | 54 | 91 |
| 72 | 62 | 53 | 93 |
| 72 | 62 | 53 | 94 |
| 72 | 61 | 53 | 96 |
| 72 | 61 | 52 | 98 |
| 72 | 60 | 52 | 99 |
| 72 | 59 | 51 | 101 |
| 71 | 59 | 51 | 103 |
| 71 | 58 | 51 | 105 |
| 71 | 57 | 50 | 106 |
| 71 | 57 | 50 | 108 |
| 71 | 56 | 49 | 110 |
| 71 | 55 | 49 | 112 |
| 71 | 55 | 48 | 113 |
| 71 | 54 | 48 | 115 |
| 71 | 53 | 47 | 117 |

-continued coated stock

| | | | |
|---|---|---|---|
| 71 | 52 | 46 | 119 |
| 71 | 51 | 46 | 121 |
| 70 | 50 | 45 | 122 |
| 70 | 49 | 44 | 124 |
| 70 | 48 | 44 | 126 |
| 70 | 48 | 43 | 128 |
| 70 | 46 | 42 | 130 |
| 70 | 45 | 41 | 132 |
| 70 | 44 | 40 | 133 |
| 69 | 43 | 40 | 135 |
| 69 | 41 | 39 | 137 |
| 69 | 40 | 38 | 139 |
| 69 | 39 | 37 | 141 |
| 69 | 38 | 36 | 143 |
| 69 | 36 | 35 | 145 |
| 69 | 35 | 34 | 146 |
| 69 | 34 | 33 | 148 |
| 68 | 32 | 33 | 150 |
| 68 | 31 | 32 | 152 |
| 68 | 30 | 31 | 154 |
| 68 | 28 | 30 | 156 |
| 68 | 27 | 29 | 158 |
| 68 | 26 | 28 | 160 |
| 68 | 25 | 27 | 161 |
| 68 | 24 | 27 | 163 |
| 68 | 23 | 26 | 165 |
| 68 | 22 | 25 | 167 |
| 69 | 21 | 24 | 169 |
| 69 | 20 | 24 | 171 |
| 69 | 19 | 23 | 173 |
| 69 | 18 | 22 | 174 |
| 69 | 16 | 21 | 176 |
| 69 | 15 | 20 | 178 |
| 69 | 13 | 19 | 180 |
| 69 | 12 | 18 | 182 |
| 70 | 10 | 17 | 184 |
| 70 | 9 | 16 | 185 |
| 70 | 8 | 15 | 187 |
| 70 | 7 | 14 | 189 |
| 70 | 6 | 13 | 191 |
| 71 | 5 | 12 | 193 |
| 71 | 4 | 11 | 194 |
| 71 | 3 | 9 | 196 |
| 71 | 2 | 8 | 198 |
| 72 | 1 | 7 | 200 |
| 72 | 0 | 6 | 201 |
| 72 | 0 | 5 | 203 |
| 72 | 0 | 4 | 205 |
| 71 | 0 | 3 | 206 |
| 71 | 0 | 3 | 208 |
| 71 | 0 | 2 | 210 |
| 71 | 0 | 1 | 211 |
| 70 | 0 | 1 | 213 |
| 70 | 0 | 0 | 215 |
| 69 | 0 | 0 | 216 |
| 69 | 0 | 0 | 218 |
| 68 | 0 | 0 | 219 |
| 67 | 0 | 0 | 221 |
| 67 | 0 | 0 | 223 |
| 66 | 0 | 0 | 224 |
| 65 | 0 | 0 | 226 |
| 65 | 0 | 0 | 227 |
| 63 | 0 | 0 | 229 |
| 61 | 0 | 0 | 230 |
| 60 | 0 | 0 | 231 |
| 58 | 0 | 0 | 233 |
| 57 | 0 | 0 | 234 |
| 55 | 0 | 0 | 235 |
| 53 | 0 | 0 | 237 |
| 52 | 0 | 0 | 238 |
| 47 | 0 | 0 | 239 |
| 42 | 0 | 0 | 240 |
| 37 | 0 | 0 | 242 |
| 31 | 0 | 0 | 243 |
| 26 | 0 | 0 | 244 |
| 21 | 0 | 0 | 245 |
| 16 | 0 | 0 | 246 |
| 11 | 0 | 0 | 247 |
| 9 | 0 | 0 | 248 |
| 8 | 0 | 0 | 249 |
| 7 | 0 | 0 | 250 |
| 5 | 0 | 0 | 251 |
| 4 | 0 | 0 | 252 |
| 3 | 0 | 0 | 253 |
| 1 | 0 | 0 | 254 |
| 0 | 0 | 0 | 255 |

5. Hardware/Program Environment

As the invention is amenable to implementation in, or as, any one of a very great number of different printer models of many different manufacturers, little purpose would be served by illustrating a representative such printer. If of interest, however, such a printer and some of its prominent operating subsystems can be seen illustrated in several other patent documents of the assignee, Hewlett Packard—such as for example the previously mentioned document of Antoni Gil Miquel, which particularly illustrates a large-format printer-plotter model.

In some such representative printers, a cylindrical platen 41 (FIG. 4)—driven by a motor 42, worm and worm gear (not shown) under control of signals from a digital electronic processor 71—rotates to drive sheets or lengths of printing medium 4A in a medium-advance direction. Print medium 4A is thereby drawn out of a supply of the medium and past the marking components that will now be described.

A pen-holding carriage assembly 20 carries several pens, as illustrated, back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-familiar four pens. The medium 4A thus receives inkdrops for formation of a desired image.

A very finely graduated encoder strip 33, 36 is extended taut along the scanning path of the carriage assembly 20 and read by a very small automatic optoelectronic sensor 37 to provide position and speed information 37B for one or more microprocessors 71 that control the operations of the printer. One advantageous location for the encoder strip, shown in earlier coowned patent documents of the assignee, is immediately behind the pens.

A currently preferred position for the encoder strip 33, 36, however, is near the rear of the pen carriage—remote from the space into which a user's hands are inserted for servicing of the pen refill cartridges. For either position, the sensor 237 is disposed with its optical beam passing through orifices or transparent portions of a scale formed in the strip.

The pen-carriage assembly 20, 20' is driven in reciprocation by a motor 31—along dual support and guide rails (not shown)—through the intermediary of a drive belt 35. The motor 31 is under the control of signals from the processor or processors 71.

Preferably the system includes at least four pens holding ink of, respectively, at least four different colors. Most typically the inks include yellow Y. then cyan C, magenta M and black K—in that order from left to right as seen by the operator. As a practical matter, chromatic-color and black pens may be in a single printer, either in a common carriage or plural carriages.

Figure 4:
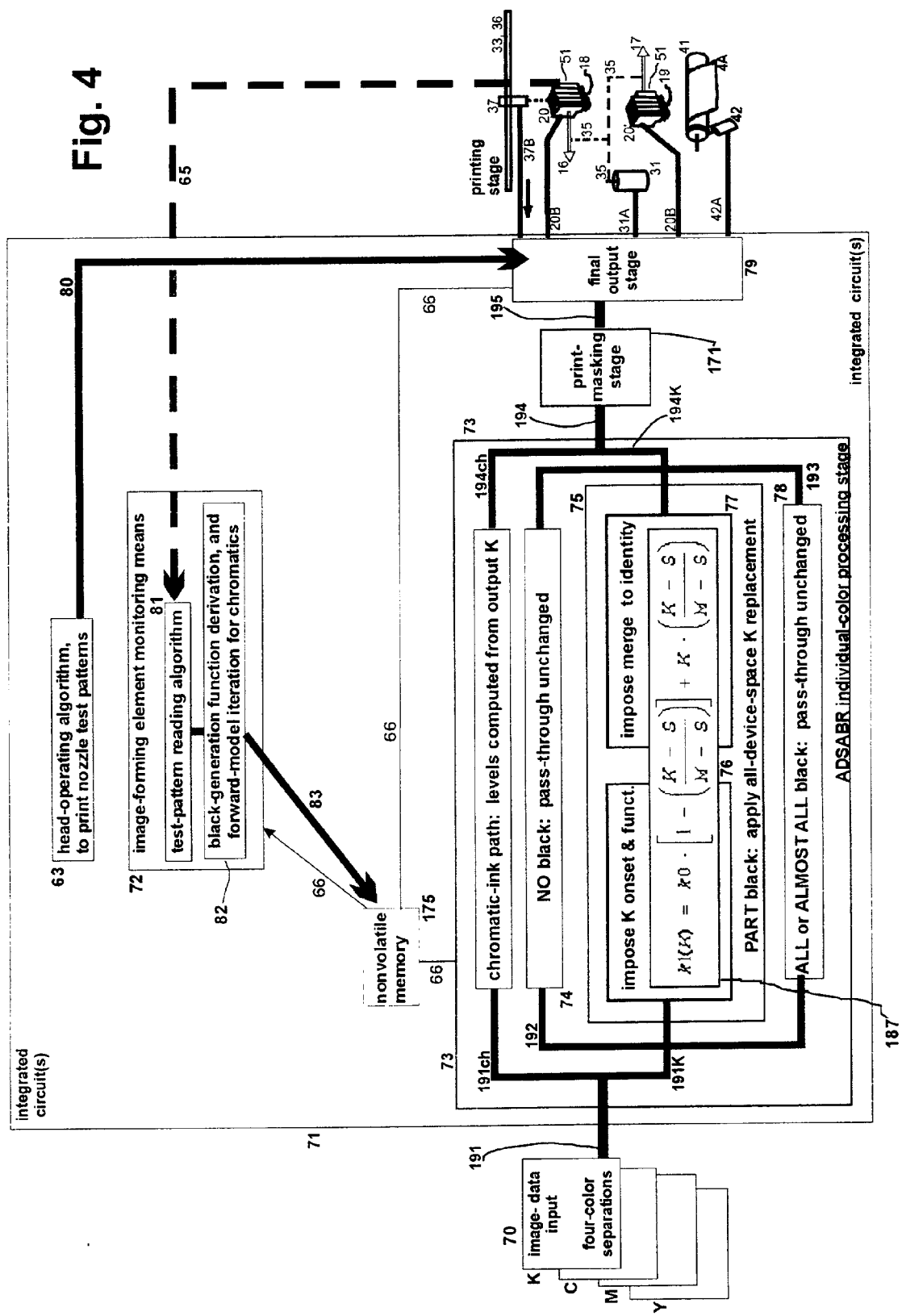
FIG. 4 is a block diagram, very highly schematic and in fact a composite view showing both certain elements of a printer such as can be used at the factory to develop ideal ABR functions and graphs as in FIGS. 1 through 3 (however, this showing is only symbolic of the preferred actual embodiment, which currently employs a free-standing spectrophotometer rather than a carriage-mounted sensor), and also certain elements of a working system as thereafter used in the field to print images based upon those ABR functions as fixed in the factory programming of the printer; thus this diagram illustrates practice of preferred embodiments of the invention at two different stages.

Also included in the pen-carriage assembly 20, 20' is a tray carrying various electronics. FIG. 4 most specifically represents a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

Before further discussion of details in the block diagrammatic showing of FIG. 4, a general orientation to that drawing may be helpful. This diagram particularly represents preferred embodiments of one previously discussed apparatus aspect of the invention.

Conventional portions of the apparatus appear as the printing stage 20 through 51, and 4A, discussed above, and also the final output-electronics stage 78 which drives that printing stage. This final-output stage 79 in turn is driven by a printmasking stage 171, which allocates printing of ink marks 18, 19 as among plural passes of the carriage 20, 20' and pens across the medium 4A.

Also generally conventional is a nonvolatile memory 175, which supplies operating instructions 66 (many of which are novel and implement the present invention) for all the programmed elements; and also four-color separation data 70, at far left in the diagram, made up of pre-separated K, C, M and Y color-plane data arrays. These data flow as input signals 191 into the processor 71.

Features particularly related to the apparatus aspect of the invention appear in the central region of the diagram as elements 72 through 78, 82, 83, 187, and 192 through 195; these will be detailed below. Given the statements of function and the diagrams presented in this document, a programmer of ordinary skill—if experienced in this field—can prepare suitable programs for operating all the circuits.

The features enumerated in the preceding three paragraphs are those features generally found in a production printer in the field. In addition, features used only at the factory in prototype or representative printers—in printers of the sort here described that are dedicated to graphic-arts use—include test-pattern-generating circuitry 63, 80, as well as a data path 65 for information that results from reading of test patterns by a small colorimeter sensor 51, or the like, that also travels on or with the pen carriage.

As noted earlier, for this invention the embodiment that is most highly preferred at present actually makes use of an entirely free-standing photometer which is capable of calorimetric measurements at highest possible precision and accuracy. Another preferred embodiment of the present invention, however, makes use of a carriage-mounted high-quality calorimeter such as taught in the patent documents of Vincent or particularly Baker, mentioned above.

Such read-out data pass to a test-pattern reading algorithm 81, in a particular module 72 of the processor 71. Test-pattern data received from the path 65 and read by the algorithm 81 are used in derivation 82 of the black-generation function—and also in the forward-model iteration for the chromatic-color functions—to generate the expressions, curves and lookup tables 83 already described.

One or more of these various forms 83 of the ABR formulation are then stored in the nonvolatile memory 175 of a production printer. There the ABR information guides the operation of that printer after it has been installed and placed in use in the field.

The pen-carriage assembly is represented separately at 20 when traveling to the left 16 while discharging ink 18, and at 20' when traveling to the right 17 while discharging ink 19. It will be understood that both 20 and 20' represent the same pen carriage, with the same pens.

The previously mentioned digital processor 71 provides control signals 20B, 20'B to fire the pens with correct timing, coordinated with platen drive control signals 42A to the platen motor 42, and carriage drive control signals 31A to the carriage drive motor 31. The processor 71 develops these carriage drive signals 31A based partly upon information about the carriage speed and position derived from the encoder signals 37B provided by the encoder 37.

(In the block diagram all illustrated signals are flowing from left to right except the information 37B, 65 fed back from the sensors 37, 51—as indicated by the associated leftward arrows—and analogously the previously mentioned information 66, 83, whose direction is likewise nonstandard.) The codestrip 33, 36 thus enables formation of color inkdrops at ultrahigh precision during scanning of the carriage assembly 20 in each direction—i. e., either left to right (forward 20') or right to left (back 20).

New image data 70 are received 191 into an image-processing stage 73—which conventionally would include a colormap module, a contrast and color adjustment or correction module, and a rendition module using dithering or error diffusion to determine a tone value to be printed at each pixel. In some embodiments of the present system, the rendition may be all worked out in advance and expressed in the separate KCMY planes of the input data; and an objective of the present invention is to preserve as much of that expression as is consistent with graininess characteristics of incremental printing.

That is the assumption followed—only for tutorial simplicity's sake—in preparation of FIG. 4 (and FIG. 5 as well); however, it is to be understood that equivalently additional, conventional processing stages may be included, and the drawings are to be interpreted as showing such other conventional stages. These may include rendition (e. g. dithering or error diffusion), ink limiting (e. g. depletion), color-saturation enhancement (e. g. propletion) and various other forms of signal modification in incremental printing, whether or not now known.

For present purposes, the processing stage 73 implements the ADSABR decision-making and adjustments described above, applying the described technique with respect to each individual color specification received. That is, in effect the incoming color data path 191 is first bifurcated within the processing stage 73, into two principal paths:

a black-ink data input path 191K, and a chromatic-ink data input path 191ch.

At the output (right) end of the ADSABR stage 73, these two paths exit as 194K and 194ch respectively, and then reconverge as an output 194 that is shown as unitary. It will be understood, however, that just as the input signal 70, 191 actually contains four separated KCMY data planes, the output 194 similarly presents four separate data sets to the previously mentioned masking stage 171.

Now reverting to the input (left) end of the ADSABR stage 73, there the black input path 191K is in turn trifurcated 192:

if a particular input color has no black (K=0), then that color signal is diverted to a passthrough path 74—and accordingly is passed through to the output path 194 unchanged;

if a particular input color is all black, or nearly so (this criterion relates to the merge value "M", and is expressed above as "K>M"), then that color signal is analogously diverted to another passthrough path 78 and similarly passed through to an output point 193 (where the two pass-through paths 74, 78 join), and is likewise unchanged; but if, however, the amount of black in an input color is in the intermediate range (that is, if 0<K<M), then that color signal passes instead into a more-complicated non-passthrough processing path 75.

(In general for orderly operation the values of S and M are typically chosen so that S<M.) The last-mentioned path 75 in turn may be regarded as including two submodules in series:

a first subblock 76 for imposing the K-onset value S, and also the exponent P that defines the behavior of the increasing function k0 at K values above the onset point; and a second subblock 77 for imposing the merge-point value M and then establishing the output signal as defined by the linear-composite function k1.

Another conceptualization of the nonpassthrough path 75 is that it simply applies the previously presented composite function k1. This conceptualization is represented in the drawing by a single block 187 that overlies both subblocks 76, 77. (Due to space limitations in the drawing, however, the initial function k0 is included by reference to that variable name, rather than by setting out the full expression for that variable.)

In any event, the trifurcated input path 191, 192 (splitting into the processing paths 74, 75, 78 just discussed) reconverges to a single output path 193, 194. This latter path proceeds into the conventional printmasking stage 171, and thence via another output path 195 into the final output stage 79 as mentioned earlier.

All the signals 191–195 are device-space signals, i. e. signals in four or more colors whether CMYK or CMYKcm (the lower-case letters representing light or dilute colorants). At no point in this system are perceptual-space manipulations or colormap operations introduced; hence the prefix "ADS" (all-device space) in the title of the "ADSABR individual-color processing stage".

As mentioned earlier, the processing stage 73 does not necessarily itself perform in real time the actual calculations indicated. This stage may instead simply process the input data by looking up the necessary answers in lookup tables—typically held in the memory module 175. Thus FIG. 4 represents both these kinds of processing, which as viewed from outside the processing stage 73 are functionally identical.

As suggested earlier in the description of drawings, the components that have now been discussed are typically present in production printers as found in the field. They are included as well in prototype and like preliminary forms of a product under development in the factory.

The upper section of the same drawing, however, includes features that may be included in only the latter development-environment devices (although some production machines may also have similar modules used for field calibration maintenance and the like)—or that may encompass some elements of an entirely free-standing colorimeter. These features include an algorithm module 63 and control-signal path 80 for operating the output stage 79 and printing stage to make test patterns; and a complementary data-return path 65 and analytical modules 72, 81, 82 for reading and using data returned from such patterns.

The returned data 65 are applied by these analytical modules 72, 81, 82 to derive the ADSABR parameters S, P and M. These parameters are then forwarded 83 for storage in the operating memory 175, which sends control signals 66 to the processing modules 74–78 discussed above.

Although this fully automatic embodiment of the invention is most highly preferred, and is very effective and satisfactory in operation, an alternative preferred embodiment adds an opportunity for greater control by the human operator using the printer. Thus a manual override or fine-tuning block 300 (FIG. 5) may be beneficially provided if desired.

The override module 300 may take the form of a graphical user interface (GUI)—for instance of the Windows® or Macintosh® variety—as illustrated. Alternatively the override module 300 may instead take any of numerous other well-known forms such as for example Linux, Unix or DOS control screens, or even a hardwired control system with physical switches, potentiometers etc.

One way, but by no means the only one, to implement manual control is simply to patch the user into the parameter set S, P, M that has been described above. Thus the user may be enabled to send the first color-processing subblock 76 an S-value signal 108 by controlling a K-onset value-setting module 102.

Figure 5:
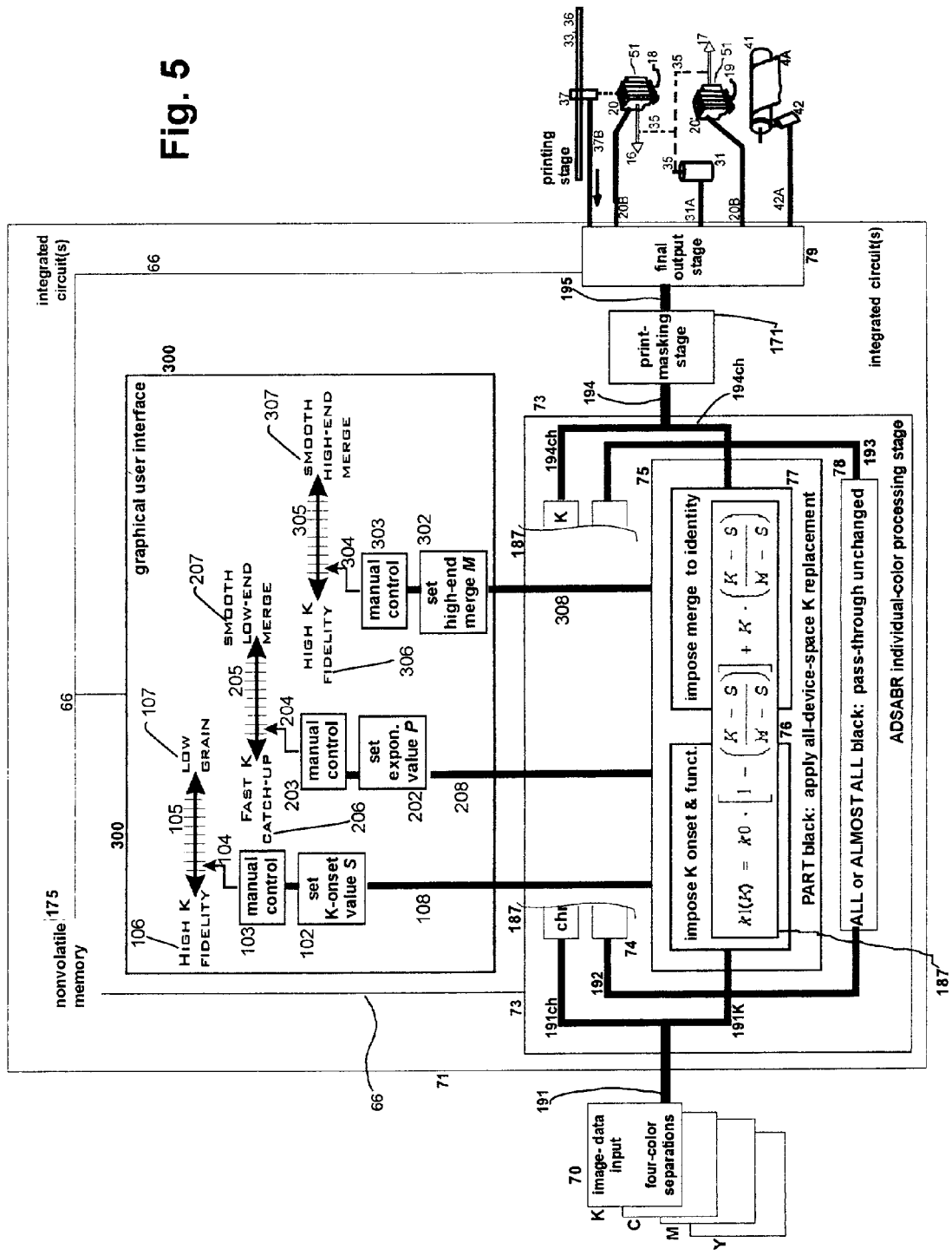
FIG. 5 is a like diagram, but showing only a printer as used in the field—and particularly one in which ABR functions are not wholly fixed at the factory but rather are subject to manual control.

(In FIG. 5, the previously discussed "no black" processing path 74 and chromatic-ink path l91*ch*–194*ch*—see FIG. 4—have been drawn cut away at 187—187 so as to permit clearer showing of the S-value signal path 108. Other signals 208, 308 discussed below are also revealed more clearly by this interruption of paths 74, 191–194*ch*.)

To send such an S-value signal 108, the user operates a manual-input unit 103. This unit 103 if present preferably includes a slider or a stepper switch 104. Again, the stepper or slider may be implemented as an on-screen selector in a personal-computer GUI, or in the other ways enumerated above if preferred—e. g. as an actual electromechanical slider or switch.

In either event the stepper or slider 104 preferably operates along a scale 105 accompanied by indicia 106, 107 to expressly present to the user the implication of trading-off granularity against more-literal adherence to the input black specifications. In the drawing, for example, it has been suggested that a minimal value 106 of the K-onset number S may be associated with "high K fidelity", and a maximal value 107 associated with "low grain".

This is a logical association, since a zero value of S makes true black ink K appear at the output 194 whenever any black K appears at the input 191—and a very high value causes input black K to be replaced by less-grainy process black CMY even into midtones and beyond. On the other hand, there are many other equivalent ways of labeling a control 104 and associated scale 105.

These include, for instance, simple mechanically descriptive legends such as "K onset" for the entire scale, and "0" at the left end 106 and "1" at the right end 107. Another approach is to label the left end "follow 4-color separations" and the right end "smooth highlights", etc.

Similarly additional control paths 208, 308 for the exponent P and high-end merge point M can be fed from analogous value-setting modules 202, 302 respectively. Each of these may in turn be operated by manual-control units 203, 303 respectively—which if desired may match the K-onset control unit 103 in operation and also in user labeling.

If preferred, the controls or their labels, or both, may take different respective forms related to the underlying differences between the natures of the parameters S, P and M. Thus for instance toggle switches, and discrete-value selectors using radio buttons and the like, are all equivalents.

Specific wordings and forms of labels 206, 207, 306, 307 shown for the latter two parameter selections—like those offered in the drawing for the K-onset scale—although logical are merely exemplary and a matter of esthetics, judgment and design choice. It will be understood that the system is entirely capable of operation with no manual-input provision 103–108, 203–208, 303–308 at all, if design philosophy undertakes to establish automatically as in FIG. 4 an ideal or acceptable setting for each parameter.

The invention is not limited to operation in four-colorant systems. To the contrary, for example six-colorant "CMYKcm" systems including dilute cyan "c" and magenta "m" colorant are included in preferred embodiments.

The integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e. g. the central processor of a general-purpose computer) operating software such as may be held for instance in a computer hard drive, or operating firmware (e. g. held in a ROM 175 and for distribution 66 to other components), or both; and may comprise application-specific integrated circuitry. Combinations of these may be used instead.

The above disclosure is intended as merely exemplary, and not to limit the scope of the invention—which is to be determined by reference to the appended claims.

What is claimed is:

1. A method of preparing for incremental printing of a color image; said method comprising:
   receiving or generating data representing a device-color implementation of the image, including respective initial representations of at least black ink and chromatic-color inks; and
   applying a substantially direct transform to:
     extract, from the initial representations, and modify quantity of black ink represented in the data, and
     recombine the modified quantity of black ink with the initial representations;
   wherein the applying step comprises automatic modification of:
     black ink represented in the data, primarily in highlight and midtone regions of the image, to mitigate graininess in those regions; and
     black ink represented in the data, in darker regions of the image, to smoothly blend black-ink quantities in the darker regions with the modified black-ink quantities in the highlight and midtone regions.

2. The method of claim 1, wherein the automatic modification of black comprises establishing:
   a black-ink onset point; and
   an increasing function of said initial representation of black ink, in regions of an image darker than the onset point.

3. The method of claim 2, wherein the automatic modification of black further comprises:
   merging said function into substantially a black-identity function in darkest regions of an image.

4. The method of claim 1, wherein the applying step further comprises automatic modification of:
   chromatic-color inks to accommodate the black-ink modifications.

5. The method of claim 4, wherein:
   the applying step comprises automatically recombining the modified quantity of black in a way that is inversely proportional to the initial representations of at least the chromatic-color inks.

6. The method of claim 5, wherein:
   the automatically recombining comprises finding in a lookup table new quantities of said representations, corresponding to said quantified black-modifying.

7. The method of claim 5, wherein:
   final ink representations C', M', Y' and K' for cyan, magenta, yellow and black respectively are found from the expressions:

$C'=C+(1-C)\cdot A_C(K)$ $M'=M+(1-M)\cdot A_M(K)$ $Y'=Y+(1-Y)\cdot A_Y(K)$ $K'=A_K(K),$ where C, M, Y and K are the initial representations of the same colors respectively, and $A_C$, $A_M$, $A_Y$ and $A_K$ are respective preestablished automatic black-replacement functions.

8. A method of preparing for incremental printing of a color image; said method comprising:
   receiving or generating data representing a device-color implementation of the image, including respective initial representations of at least black ink and chromatic-color inks; and
   applying a substantially direct transform to:
     extract, from the initial representations, and modify quantity of black ink represented in the data, and
     recombine the modified quantity of black ink with the initial representations;
   wherein the applying step comprises automatic modification of black ink represented in the data, in highlight and midtone regions of the image; and
   wherein the direct transform application comprises finding in a lookup table new quantities of said representations, corresponding to said quantified black-modifying.

9. A method of preparing for actual hardcopy incremental printing of a color image; said method comprising:
   receiving or generating data representing a device-color implementation of the image, including respective initial representations of at least black ink and chromatic-color inks; and
   applying a substantially direct transform to:
     extract, from the initial representations, and modify quantity of black ink represented in the data, and
     recombine the modified quantity of black ink with the initial representations;
   wherein color initially having no black-ink component is passed through, without modification, substantially to said actual hardcopy printing.

10. A method of preparing for incremental printing of a color image; said method comprising the steps of:
    receiving or generating data representing a device-color inplementation of the image, including respective initial representations of at least black ink and chromatic-color inks; and
    applying a substantially direct transform to:
      extract, from the initial representations, and modify quantity of black ink represented in the data, and
      recombine the modified quantity of black ink with the initial representations;

a human operator's a manipulation of a control that selects an amount and a direction of black-ink modification; and thereafter, substantially automatic operation of said direct transform to effectuate the modifying and recombining parts of the applying step according to the operator's selection.

11. An incremental printing system for forming an image by construction from dots deposited on a printing medium, based upon original image data in device-color space; said system comprising:

a direct device-color to device-color substantially automatic computation module for modifying color image data with no manipulation in terms of perceptual color parameters; and an output incremental printing stage for printing the image from the modified data.

12. The system of claim 11, wherein the automatic module comprises:

an input for receiving such original image data in the form of initial four-or-more-color separations; and output for directing four-or-more-color separations to the output stage.

13. An incremental printing system for forming an image by construction from dots deposited on a printing medium, based upon original image data in device-color space; said system comprising:

a direct device-color to device-color substantially automatic computation module for modifying color image data with no manipulation in terms of perceptual color parameters; and an output incremental printing stage for printing the image from the modified data;

wherein the automatic module comprises a computation submodule for establishing:

a black-ink onset point; and an increasing function of an initial amount of black ink, in regions of an image darker than the onset point.

14. The system of claim 13, wherein the automatic module further comprises:

a computation submodule for merging said function into substantially a black-identity function in darkest regions of an image.

15. An incremental printing method for forming an image by construction from dots deposited on a printing medium, based upon original image data in device-color space; said method comprising the steps of:

a direct device-color to device-color substantially automatic computation to modify color image data with no manipulation in terms of perceptual color parameters; and then incrementally printing a hardcopy image from the modified data.

16. An incremental-printing image-preparation method, for accommodating personnel who are accustomed to thinking in terms of ink combinations rather than in terms of numerical perceptual color models; said image to be printed based upon an original image data file that substantially expressly represents inking to be used; said method comprising the steps of:

receiving from said personnel an indication of quantity of black ink and other inks desired, in the form of at least four color separations, for use in incremental printing; and in preparing for incremental printing, directly and automatically implementing changes in represented quantity of black ink, for colors that initially have black ink.

17. An incremental-printing image-preparation method, for accommodating personnel who are accustomed to thinking in terms of ink combinations rather than in terms of numerical perceptual color models; said image to be printed based upon an original image data file that substantially expressly represents inking to be used; said method comprising the steps of:

receiving from said personnel an indication of quantity of black ink and other inks desired, in the form of at least four color separations, for use in incremental printing; and in preparing for incremental printing, directly and automatically implementing changes in represented quantity of black ink, for colors that initially have black ink;

wherein the change-implementing step comprises automatic reduction of black ink represented in the data, primarily in highlight and midtone regions of the image, to mitigate graininess in those regions.

18. An incremental-printing image-preparation method, for accommodating personnel who are accustomed to thinking in terms of ink combinations rather than in terms of numerical perceptual color models; said image to be printed based upon an original image data file that substantially expressly represents inking to be used; said method comprising the steps of:

receiving from said personnel an indication of change in quantity of black ink desired, in incremental printing; and directly implementing the indicated change, in actual incremental hardcopy printing.

19. The method of claim 18, wherein:

the indication is substantially without reference to any perceptual color model.

20. The method of claim 18:

wherein the implementing step comprises automatic adjustment in quantities of chromatic inks, compensating for the indicated change in quantity of black ink;

wherein said compensating comprises substantially maintaining tonal values in areas of ink change; and further comprising the step of applying the data file with the implemented change, to printmasking for hardcopy printing.

21. An incremental printing system for forming an image by construction from dots deposited on a printing medium, based upon original image data in device-color space, under control of a user; said system comprising:

a direct device-color to device-color graphical computer interface module for enabling the user to modify color image data in preparation for printing, without requiring the user to directly manipulate perceptual color parameters; and an output incremental printing stage for printing the image from the modified data.

22. The system of claim 21, wherein the interface comprises controls enabling the user to set substantially directly:

a black-onset point; and an increasing function of an initial amount of black ink, for black-containing colors darker than the black-onset point.

23. The system of claim 22, wherein:

the interface further comprises controls enabling the user to substantially directly set merging of said function with a black-identity function in darkest regions of the image.

* * * * *

UNITED STATES PATENT AND TRADEMARK OFFICE
CERTIFICATE OF CORRECTION

PATENT NO.       : 7,088,470 B2
APPLICATION NO.  : 09/874524
DATED            : August 8, 2006
INVENTOR(S)      : Johan Lammens et al.

It is certified that error appears in the above-identified patent and that said Letters Patent is hereby corrected as shown below:

In column 2, line 18, delete "calorimetric" and insert -- colorimetric --, therefor.

In column 3, line 39, delete "calorimetric" and insert -- colorimetric -- therefor.

In column 3, line 64, delete "calorimetrically" and insert -- colorimetrically --, therefor.

In column 4, line 19, after "forgiving" delete "giving".

In column 6, line 52, delete "calorimetric" and insert -- colorimetric --, therefor.

In column 6, lines 54-55, delete "calorimetric" and insert -- colorimetric --, therefor.

In column 11, line 11, delete "roted" and insert -- noted --, therefor.

In column 16, line 67, delete "calorimetric" and insert -- colorimetric --, therefor.

In column 27, lines 47-48, delete "calorimetric" and insert -- colorimetric --, therefor.

In column 27, line 51, delete "calorimeter" and insert -- colorimeter --, therefor.

In column 32, line 60, in Claim 10, delete "inplementation" and insert -- implementation --, therefor.

In column 33, line 1, in Claim 10, after "operator's" delete "a".

UNITED STATES PATENT AND TRADEMARK OFFICE
CERTIFICATE OF CORRECTION

PATENT NO. : 7,088,470 B2
APPLICATION NO. : 09/874524
DATED : August 8, 2006
INVENTOR(S) : Johan Lammens et al.

It is certified that error appears in the above-identified patent and that said Letters Patent is hereby corrected as shown below:

In column 33, line 21, in Claim 12, insert -- an -- before "output".

Signed and Sealed this

Twenty-fourth Day of February, 2009

JOHN DOLL
*Acting Director of the United States Patent and Trademark Office*